Dec. 7, 1954  L. BERNOT  2,696,514
DRY BATTERY
Filed June 27, 1952
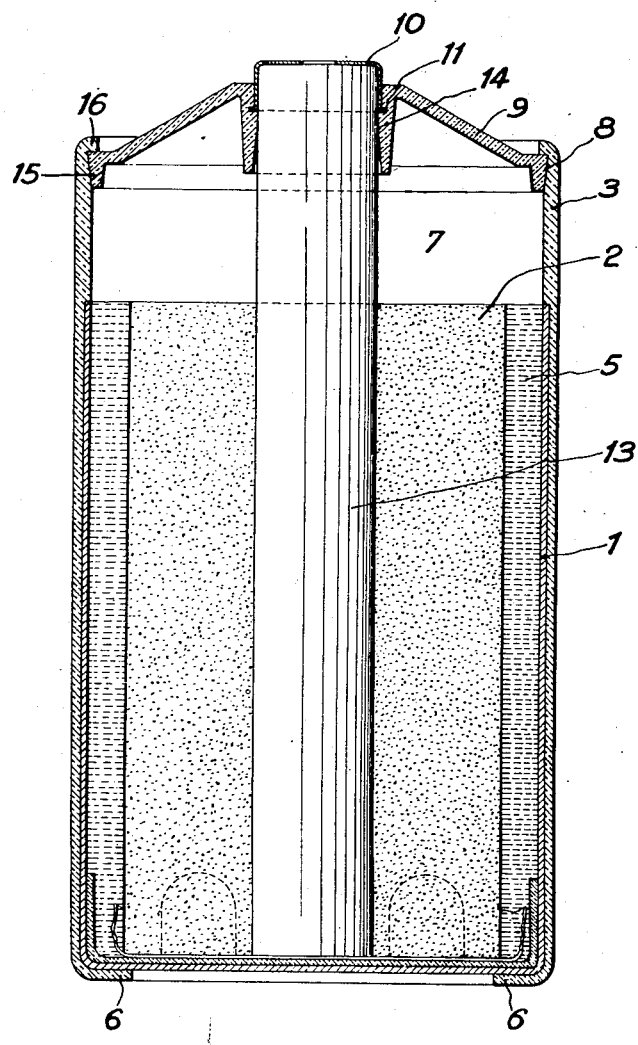
Inventor
Lucien Bernot
By
Henderoth, Lind & Ponack
Attorneys.

United States Patent Office 2,696,514
Patented Dec. 7, 1954

2,696,514

DRY BATTERY

Lucien Bernot, Saint-Ouen, France, assignor to Société Anonyme dite: Societe des Piles Wonder, Saint-Ouen (Seine), France Application June 27, 1952, Serial No. 296,036

Claims priority, application France March 19, 1952

6 Claims. (Cl. 136—133)

The present invention relates to dry batteries and battery cells of cylindrical shape.

Presently, most of the said dry batteries or cells include a cylindrical zinc tube which provides the negative electrode of the cell. The height of the said zinc tube is larger than that of the mass of depolarizer compressed therein, and this, with a view to leave an expansion chamber for the electrolyte in the top of the cell. The consequence is that the portion of the zinc tube which is effective in the operation of the cell does not extend higher than the level of the depolarizer, while the remainder is wasted.

My invention has for its object a cylindrical dry-battery cell which includes a hollow cylindrical zinc electrode together with an axial carbon electrode and which is characterized thereby that said cell is enclosed in a cylindrical plastic sheath lined inside with a thin zinc electrode which leaves the top end of said sheath bare and thereby that the layer of electrolyte and the mass of depolarizer are substantially co-extensive with said zinc electrode, with the result that the expansion chamber occupies a portion of the sheath which is not lined with zinc.

Further objects and features of my invention will be set forth in the following description of a preferred embodiment of my new cylindrical dry battery cell, which is represented in longitudinal sectional view in the drawing appended hereto.

As shown in the drawing, the battery cell includes a cylindrical zinc receptacle 1 the height of which is equal to that of the compressed depolarizer mass 2. In this manner, the zinc receptacle is availed of throughout its height for current generation.

Said zinc receptacle 1 is enclosed in a cylindrical sheath 3 molded thereon of a thermoplastic material, with the result that the zinc receptacle together with the plastic sheath provide an inseparable unit. In this manner, the sheath 3 is lined inside with the zinc receptacle 1 over a portion of its height. The inside of the zinc receptacle 1 is in contact with an annular electrolyte filling 5. The sheath 3 is bent in at its lower end to a narrow annular flange which however is sufficiently wide to provide for a reliable adhesion of the plastic as well as for a perfectly tight seal of the cell in the event the side wall of the zinc tube 1 should happen to be punctured. The top end of the plastic sheath 3 extends beyond the top end of the zinc receptacle 1 to provide the expansion chamber 7 for the electrolyte. Moreover, the plastic sheath 3 is formed at its top end with an annular bevel 8 designed to house a molded cover 9 by which the sheath 3 is closed.

The said cover 9 is likewise made of a thermoplastic material, e. g. polystyrol. It is formed with an axial bore 14 closed with a brass cap 10 formed at its edge with a bead 11 which is embedded in the plastic cover 9, whereby the two parts are made perfectly rigid with each other.

In order more easily to stick the carbon rod 13 through the axial bore 14 in the cover 9 into the cap 10, said bore is flared out inside and narrows progressively to the inner diameter of the cap in which said rod can thus be made a tight fit. An additional result is that if the electrolyte happens to swell into the expansion chamber consequent to an overtiring of the cell the cap is protected against any oxidation by the electrolyte.

The cover 9 is formed at its periphery with a downwardly projecting and externally beveled flange 15 to be retained by the correspondingly beveled annular recess 8 in the upper end of the plastic sheath, whereby here again a reliable seal is obtained.

In order to secure a still more reliable connection between the two beveled surfaces, same may be cemented to one another, owing to which they can be converted to an inseparable unit since they are made of one and the same material. Still a more reliable connection can be obtained by beading the top end of the sheath over the edge of the cover 9.

Should it happen that in the working of the battery any zinc receptacle perforates, this would not stand in the way of availing same down to exhaustion, because no electrolyte can ooze out of it.

An important advantage of the cell according to my invention resides in the fact that the zinc electrode is availed of throughout its height whereas in cells of the prior art a considerable portion of the top end of the same was not, which means that a substantial metal saving is achieved thereby.

Moreover, in most of the cells known up to the present, what constitutes the receptacle is the zinc tube itself, with the consequence that the manufacturer is compelled to make it thick enough to avoid the aforestated inconveniences. According to my invention and owing to the intimate adhesion of the cylindrical elements 1 and 3 to each other, it becomes possible to use such a thin zinc receptacle that the whole of the metal is consumed in the course of the current-generating process. This means that a new saving is added thereby to the one owable to the shortening of the height of the zinc tube length.

It has been explained that the capacity of the chamber for the expansion of the electrolyte is increased considerably since said chamber here extends from the surface of the compressed depolarizer up to the ceiling of the cover whereas in most of the cells of the prior art the said expansion chamber is delimited at its bottom by the top surface of the depolarizer mass and at its top by the lower side of the insulating washer which, on account of mounting requirements, is located at a much lower level, with the consequence that the capacity of the expansion chamber is decreased considerably.

Conversely, if it were chosen to limit the capacity of the expansion chamber to what it is in most conventional cells, it might be advisable to raise the levels of the depolarizer mass and the zinc receptacle, whereby the capacity of the battery would be increased correspondingly.

What I claim is:

1. A casing for a dry battery cell having carbon and zinc electrodes, a depolarizer and an electrolyte, comprising, a cylindrical zinc receptacle having a closed bottom and an open top, an insulating plastic sheath molded about said receptacle which extends at its upper end beyond the top edge of said receptacle and is flanged over the bottom of said receptacle to expose the zinc electrode, said sheath being tapered at its upper edge, an insulating plastic cover for said sheath having a centrally located terminal cap embedded therein which covers the carbon electrode, said cover having a portion which extends downwardly below said cap and about said carbon electrode to form a short sheath for said carbon electrode, said cover having an outer cylindrical periphery which extends downwardly to form a lip, said lip being inwardly tapered to interfittingly engage with said upper tapered edge of said sheath and securing means in cooperation with said interfitting edge and lip to seal said cover to said casing to provide a leak resistant cell.

2. A casing as in claim 1 wherein the casing is filled with electrolyte at a level even with the upper edge of said zinc receptacle.

3. A casing as in claim 1 wherein said securing means is an inwardly crimped upper edge portion of said sheath.

4. A casing as in claim 1 wherein said securing means is a cement at the upper interfitting edge of said sheath and lip.

5. A casing as in claim 1 wherein said securing means is a cemented seal and the cover and casing are made of the same thermoplastic material.

6. A casing as in claim 5 wherein said thermoplastic material is polystyrene.

References Cited in the file of this patent

UNITED STATES PATENTS

| Number | Name | Date |
|---|---|---|
| 2,411,272 | Keller | Nov. 19, 1946 |
| 2,419,589 | Paul | Apr. 29, 1947 |
| 2,427,561 | Keller | Sept. 16, 1947 |
| 2,427,914 | Koretzky et al. | Sept. 23, 1947 |
| 2,505,014 | Terlizzi et al. | Apr. 25, 1950 |
| 2,595,963 | Lewis et al. | May 6, 1952 |
| 2,642,470 | Reinhardt et al. | June 16, 1953 |